United States Patent [19]

Barber

[11] 4,373,893
[45] Feb. 15, 1983

[54] BENCH SCALE DRUM AGGLOMERATOR AND POWER MEANS

[75] Inventor: James C. Barber, Florence, Ala.

[73] Assignee: James C. Barber and Associates, Inc., Florence, Ala.

[21] Appl. No.: 316,344

[22] Filed: Oct. 29, 1981

Related U.S. Application Data

[62] Division of Ser. No. 223,122, Jan. 7, 1981.

[51] Int. Cl.³ .............................................. B22F 3/00
[52] U.S. Cl. .................................... 425/222; 264/117
[58] Field of Search ......................... 425/222; 264/117

[56] References Cited

U.S. PATENT DOCUMENTS

| 2,920,344 | 1/1960 | Stirling | 425/222 |
| 4,099,899 | 7/1978 | Gunnell | 425/222 |
| 4,136,975 | 1/1979 | Forseth | 425/222 |

Primary Examiner—James R. Hall

[57] ABSTRACT

A process and product of waste recovery at phosphorus furnaces is disclosed wherein small sized discrete particles of carbonaceous material or beneficiated phosphate ore are mixed with a mineral acid, an alkaline fluid and water, and the reacted mixture is tumbled in a horizontal cylinder at a temperature below that at which the carbonaceous material oxidizes to form agglomerates which are then indurated to discrete particulate size as desired for a charge component; the agglomerates are fed to a phosphorus smelting furnace together with other materials needed to make elemental phosphorus, furnace gases are cooled with recirculating water, a side stream of the water is taken off, treated, and used as feedstock in fluid fertilizers. Apparatus is disclosed for agglomerating coke and phosphate and, further, for measuring the abrasion and shatter resistance of agglomerates.

2 Claims, 4 Drawing Figures

BENCH SCALE DRUM AGGLOMERATOR AND POWER MEANS

This application is a divisional application of my copending application Ser. No. 223,122, filed Jan. 7, 1981 for ENERGY CONSERVATION AND POLLUTION ABATEMENT AT PHOSPHORUS FURNACES.

BACKGROUND OF THE INVENTION

1. Field of the Invention

My invention relates in general to energy conservation and waste recovery at phosphorus furnaces, and it deals more particularly with a process and apparatus for waste recovery at phosphorus furnaces by low energy agglomeration thereof in a matched particulate component which may be used as a recharging component for such a furnace and for other purposes.

Elemental phosphorus is produced by smelting a mixture of mineral phosphate, coke, and silica rock in a submerged arc electric furnace. The mineral phosphate is usually agglomerated at high temperatures by processes similar to those employed in the metallurgical industry. Development of the phosphorus furnace process is described in a TVA publication ("Production of Elemental Phosphorus by the Electric-furnace Method," R. B. Burt and J. C. Barber, Chemical Engineering Report No. 3, 1952, National Fertilizer Development Center, Muscle Shoals, Ala. 35660). Development of agglomeration processes for phosphorus furnace feed materials is given in another TVA publication ("Agglomeration of Phosphate for Furnace Use," E. L Stout, Chemical Engineering Report No. 4, National Fertilizer Development Center, Muscle Shoals, Ala. 35660).

It is noted that much particulate matter is emitted during high temperature agglomeration of the phosphate. About 12 percent of the fluorine combined in the phosphate ore is evolved, although this percentage will vary with the temperature. Much energy is expended in air pollution abatement, and water waste problems are created. Large quantities of fuel are consumed.

No fluorine is emitted with low temperature agglomeration of the mineral phosphates, and particulate emission is small. The energy requirement is reduced from the range of $2.5 \times 10^6$ to $4 \times 10^6$ million Btu per ton of agglomerates to about 800,000 Btu.

Metallurgical coke is generally purchased for use as a reducing carbon in phosphorus furnaces. However, the coke fines (minus 10-mesh material) adversely affects furnace operation. About fifteen percent of the purchased coke is fines. When the fines are removed, a solid waste problem is created unless some use can be found for this material.

I have discovered that mineral phosphates can be agglomerated at low temperature by a novel application of surface tension forces. Coke fines may be agglomerated at low temperature by similar application of surface tension forces to prepare properly sized material for use as a reducing carbon in the phosphorus furnace according to the present invention. Also, the agglomeration processes may be applied to other carbonaceous materials, such as calcined anthracite, and thereby relieve the current shortage of metallurgical coke.

My invention deals with the recovery of small sized coke material and condenser bleed-off water at phosphorus furnaces. The small sized coke is agglomerated by a new process, as described herein, and this will permit the coke to be used in phosphorus furnaces as a reducing carbon. Condenser bleed-off water, after treatment, can be used as a feedstock in making fluid fertilizers. Sludge acid separates from merchant-grade wet-process phosphoric acid, and this waste material can be used as a binder in the new agglomeration process of this invention.

Likewise, flotation tailing is obtained when phosphate ores are beneficiated. This new agglomerating process will permit this waste to be combined with phosphate concentrates and agglomerated to make a self-fluxing furnace charge material. The improved agglomeration process makes it possible to use phosphorus furnace charge materials with matched average sizes and size distributions. As a result, segregation in the furnace is essentially eliminated and furnace pressure fluctuations reduced. The overall result is less electric energy used for smelting and less loss of elemental phosphorus from inleakage of air.

2. Discussion of Prior Art

After a competent search of the state of the art, no existing process and product of waste recovery at phosphorus furnaces was disclosed embodying the principles of the present invention directed to such purposes, and no bench scale apparatus of the type used herein for such agglomeration was revealed. The prior art discloses the following U.S. patents:

U.S. Pat. No. 2,040,081, Mar. 12, 1936, Harry A. Curtis. A process is disclosed in this patent for the agglomeration of finely ground phosphate in a pug mill. This invention relates to the process of agglomerating fine phosphate rock from an original ore.

U.S. Pat. No. 2,741,545, Apr. 10, 1956, F. T. Nielsson. This is a forerunner of all of the ammoniation-granulation patents in the manufacture of fertilizer.

U.S. Pat. No. 3,012,874, Dec. 12, 1961, A. B. Phillips, et al. In this patent calcium metaphosphate is granulated with hot water.

U.S. Pat. No. 3,034,883, May 15, 1962, T. P. Hignett, et al. This is a process for the agglomeration of a fertilizer mixture where superphosphate is produced in place in the binder.

U.S. Pat. No. 3,113,858, Dec. 10, 1963, A. V. Slack, et al. This is a patent which deals with the production of suspension fertilizers.

U.S. Pat. No. 3,177,062, Apr. 6, 1965, T. P. Hignett, et al. This is a process for granulating ground phosphate whereby elemental sulfur is the binder.

U.S. Pat. No. 3,202,744, Aug. 24, 1965, J. C. Barber, et al. In this patent, a phosphorus sludge is used as a binder to briquet phosphorus furnace feed.

U.S. Pat. No. 3,335,094, Aug. 8, 1967, W. J. Darby. This is a process for preparing a briquetted mixture of phosphate, silica and coke having a high electrical resistance.

U.S. Pat. No. 3,464,809, Sept. 2, 1969, G. C. Hicks. This is a process for making granular ammonium sulfate in the ammoniator-granulator.

U.S. Pat. No. 3,813,233, May 28, 1974, L. A. Kendrick, Jr. This is a process for making a high-analysis suspension fertilizer from merchant-grade wet-process phosphoric acid.

SUMMARY AND OBJECTS OF THE INVENTION

A summary of the beneficial objects and features of my invention necessitate the consideration of the production of elemental phosphorus by the normal means of smelting a mixture of phosphate, coke and silica in an electric furnace. This has previously been referred to in a paper prepared by the inventor for the National Fertilizer Development Center, at Muscle Shoals, Ala. One ton of phosphorus normally requires 9.5 tons of phosphate rock, 1.5 tons of coke, and 1.7 tons of silica rock. This mixture is smelted by heat from submerged electric arcs to reduce combined phosphorus to the elemental form. Other materials formed in the phosphorus furnace are slag, consisting of calcium silicate and calcium aluminate; ferrophosphorus, and carbon monoxide gas. The gas leaving the furnace is a mixture of phosphorus vapor, carbon monoxide, carbon dioxide, methane, and hydrogen, but the principal constituents are carbon monoxide and phosphorus vapor. The gas is cooled to condense the elemental phosphorus. Noncondensable constituents in the furnace gas are used as a fuel, or are flared.

The slag and ferrophosphorus are tapped from the furnace and may be disposed of as by-products of phosphorus production.

Lump or agglomerated materials are generally required for use in phosphorus furnaces, although sizing of the phosphate feed is not as important for small furnaces as it is for large ones. Phosphate ores seldom occur in nature in the size range suitable for use in phosphorus furnaces, and phosphate is agglomerated at the larger furnaces (powerloads of 25 megawatts or higher).

Phosphates are agglomerated by processes similar to those employed in the metallurgical industry. In nodulizing, small size ores are heated to the point of incipient fusion in a rotary kiln. Sufficient melting occurs to form a cohesive mixture of solid and liquid phases and the mixture is tumbled to form agglomerates. Large amounts of energy are consumed in this operation (3.5 to 4.0 million Btu per ton of furnaceable material). It is difficult to control the amount of liquid phase formed in the kiln, and the size of the agglomerated product varies from balls as large as four feet in diameter to unagglomerated fines. The large balls are crushed, small sized material is removed by screening, and materials fed to the furnace will have a size range of minus two inch to plus six mesh. The average size of the nodulized phosphate is about 0.8 inch.

Phosphates may be agglomerated by pelletizing, briquetting, or compacting. The agglomerates have low strength when they are formed but they are indurated by calcination. The phosphates are calcined at temperatures below fusion and energy requirements for agglomeration are less than for nodulizing (2.5 to 3.0 million Btu per ton of furnaceable product.) Low grade phosphates generally contain clay and they are more amenable to agglomeration than high grade phosphates. Clay serves as a binder in compacting and briquetting. In nodulizing, the clay fraction melts at a lower temperature than does other materials in the ore. Unfortunately, clay has an adverse effect on phosphorus furnace operation, and low grade ores consume more energy during smelting than do high grade ores.

Silica rock is frequently available in lump form and no agglomeration is needed. The silica rock is put into the phosphorus furnace to provide a reactant ($SiO_2$) to combine with calcium oxide and form calcium silicate. Calcium oxide also combines with alumina in the phosphate to form calcium aluminate. An $SiO_2$:CaO weight ratio in the range of 0.85 to 0.95 is adequate. Sometimes low grade phosphates may contain enough $SiO_2$ and no silica rock is added. When lump silica rock is used, its size seldom matches the size of agglomerated phosphate. This leads to segregation in the furnace.

The coke supplies carbon to combine with the oxygen and form carbon monoxide, thereby reducing combined phosphorus to the element. Metallurgical coke is commonly used as the reducing carbon, but the carbon may come from other sources such as petroleum coke, reformed coke, anthracite coal, low-volatile bituminous coal, or charcoal.

Metallurgical coke consists of particles ranging from 100 mesh to ¾-inch in size. Materials smaller than 10 mesh are generally removed by screening. The minus 10 mesh coke fines are fed to the furnace at a controlled rate, or the fines may be discarded as a solid waste. Coke fines are ineffective as a reducing agent; furthermore, phosphorus furnace operation is improved by eliminating fines from the furnace charge. Heretofore, technology has not been available to permit the effective use of coke fines in the phosphorus furnace.

When the three furnace charge components—phosphate, silica, and coke—have about the same size and size distribution, phosphorus furnace operation is markedly improved. A furnace power chart illustrates the decrease in fluctuations of the powerload in changing from the regular charge to a charge with matched particle sizes. The power chart with unmatched particle sizes showed great fluctuations when phosphate was agglomerated by nodulizing. In such an operation, minus 10-mesh fines were screened out of the coke, but these fines were fed back to the furnace at a controlled rate to avoid accumulation of solid waste. The average size of the nodules fed was about 0.8 inch and the average size of coke was 0.3 to 0.4 inch. The phosphate contained 23.5 to 24.5 percent $P_2O_5$ and it contained enough $SiO_2$ to provide a 0.85 $SiO_2$:CaO ratio in the charge. No silica rock was fed.

Minimal fluctuations showed on a power chart with matched sizes of phosphate and coke. The phosphate contained enough $SiO_2$ and no silica rock was fed. The phosphate was briquetted and then calcined in a rotary kiln at a temperature of about 2200° F. to indurate the briquets. Average size of the phosphate fed to the furnace was 1.0 inch. Special large size coke was purchased for the test and the coke was prepared to give an average size of about 1.0 inch. The coke and calcined briquets fed to the furnace had about the same size distribution and there was little tendency for the materials to segregate.

The powerload on the furnace was set at 9400 kW but with the regular charge the average powerload was 8100 kW, or 13.8 percent lower than the set load. When matched sizes of coke and phosphate were fed, the average powerload was 9300 kW, or 1.3 percent lower than the set load. These data show that the capacity of a phosphorus furnace can be increased about 12 percent by changing from unmatched to matched charge sizes.

Similarly, when we examine a pressure chart for a furnace, it shows the decrease in furnace pressure fluctuations that occur when unmatched sizes of nodules and coke are replaced by matched sizes of these materials. In such a test run, using briquets for the matched size charge, the time on the graph was noted when matched size materials first entered the furnace. This graph proved that pressure variations decreased markedly with the matched sizes of charge component.

The electrical energy consumption was about ten percent lower with matched charge than it was with the regular charge of nodules and coke. However, the test run of two days was not long enough to obtain accurate data, and it was impractical to obtain enough material to make a longer test.

Major benefits realized from use of closely matched charge material over unmatched material are summarized below:

1. Powerload fluctuations are decreased, and this permits the capacity of a furnace to be increased without expenditure for additional production facilities. Fixed costs are thereby reduced.

2. Furnace pressure fluctuations are decreased and this decreases losses of phosphorus caused by air being drawn into the furnace gas stream. Air oxidizes elemental phosphorus to $P_2O_5$. When furnace pressure fluctuations are decreased, leakage of furnace gases into the workroom environment is lessened. Obnoxious and poisonous gases ($P_2O_5$, CO, and fluorides) escape through openings in the furnace roof, feed chutes, and offtake ducts when the pressure increases.

3. The electrical energy consumed in smelting phosphate is reduced when matched charges are used.

The benefits from using matched sizes of furnace charge components have been known for about twelve years. Heretofore, agglomerating processes to make matched sizes of the furnace charge materials were unknown.

Gases leaving the phosphorus furnace consist mainly of carbon monoxide and phosphorus vapor. By volume, ten percent of the gas is phosphorus vapor. The gases are cooled to condense the phosphorus as a liquid. Water is brought into contact with phosphorus during condensing and storage of the element and sometimes water is used in treating impure phosphorus. As a result, water becomes contaminated with elemental phosphorus, phosphoric acid, and fluosilicic acid and insoluble matter. Although the water may be used repeatedly in phosphorus condensing operations, accumulation of contaminants will necessitate that part of the recirculating water be drawn off and replaced with fresh water.

Effluents containing elemental phosphorus are a serious water pollution problem. Watercourses containing about 40 parts per billion may be toxic to marine animals. Technology is not currently available for removal of elemental phosphorus in water to a level which will render the water innocuous to marine animals.

Accordingly, one of the objects of the present invention is to provide a small scale (bench scale) apparatus suitable for experimental agglomeration. In connection therewith, another object of the present invention is to provide a low cost, lightweight agglomerator of the type described with speed control equipment capable of turning the drum at any speed below the critical speed. In connection therewith, a feature of the assembly must be that it shall assume a size small enough to place inside of a laboratory hood but large enough to obtain meaningful data on the agglomeration of materials such as coke and phosphate.

Another object of the present invention is to prepare mixtures of coke fines and acidic material which, upon ammoniating and tumbling in a rotating drum, will be agglomerated to form particles large enough to use in phosphorus furnaces. Agglomeration of the coke fines in this manner will permit recovery of the fines as a useful reducing agent, and will avoid a solid waste problem at phosphorus furnaces.

Another object of the invention is to prepare mixtures of small sized phosphate and acidic materials which, upon ammoniation, will agglomerate into particles suitable for charging into the phosphorus furnace. Agglomeration of the small sized phosphate will aid in preparing matched sizes of a furnace charge.

Another object is to prepare an agglomerated mixture of phosphate concentrate and flotation tailing. Flotation tailing is obtained when phosphate ores are beneficiated. The new agglomerating process will permit this waste to be combined with phosphate concentrate and agglomerated to make a self-fluxing furnace charge material. The phosphate concentrate thus obtained is the high grade phosphatic material obtained by beneficiating phosphate ores, as aforesaid. The tailing, or waste material, consists mainly of quartz silica, but it also contains some phosphate. It is an objective to prepare an agglomerated mixture which will have an $SiO_2$:CaO weight ratio in the range of 0.85 to 0.95. The agglomerate will be self-fluxing and essentially without clay as an impurity.

Another object of the invention is to provide low energy consuming agglomeration processes for both phosphate and coke. Matched sizes of phosphate and coke will be prepared, and this will eliminate segregation of the charge materials during smelting.

Another object is to use condenser bleedoff water as a feedstock for making suspension fertilizers. The condenser bleedoff water is clarified and centrifuged to reduce the elemental phosphorus to about 12 ppm—a concentration low enough to permit the waste to be used in making 13.5-38-0 suspension fertilizer. The condenser bleedoff water must undergo much more extensive treatment to reduce the elemental phosphorus content enough to render the waste innocuous to marine animals. Nutrients (N and $P_2O_5$) in the wastes are recovered and fluosilicic acid is beneficial as a crystal modifier.

A final object is to use sludge acid as a binder in preparing agglomerates. Sludge acid results from the post-precipitation of impurities in merchant-grade wet-process phosphoric acid.

Thus it can be seen that features of this invention involve processes for the recovery of small sized coke material and condenser bleedoff water at phosphorus furnaces. The small sized coke is agglomerated by a new process and this will permit the coke to be used in phosphorus furnaces as a reducing carbon. Condenser bleedoff water can be used as feedstock in making a fluid fertilizer. Sludge acid separates from merchant-grade wet-process phosphoric acid, and this waste material can be used as a binder in the new agglomerating process. Flotation tailing, which is obtained when phosphate ores are beneficiated, can by this new process be combined with phosphate concentrate and agglomerated to make a self-fluxing furnace charge material.

DETAILED DESCRIPTION OF THE INVENTION

As we have previously stated in the objects occupying the summary of this invention, much prior research in this field shows that to have matched sizes of phosphate and coke as the charge in a phosphorus furnace is highly beneficial and results in a more efficient operation. Experimental data show that the capacity of a phosphorus furnace can be increased about 12 percent by changing from unmatched to matched charge sizes.

At the same time, this research showed that there was a marked decrease in furnace pressure fluctuations which occurred when unmatched sizes of nodules and coke were replaced by matched sizes of these materials. This has, as stated, reduced electrical energy consumption by approximately ten percent.

Figure 1:
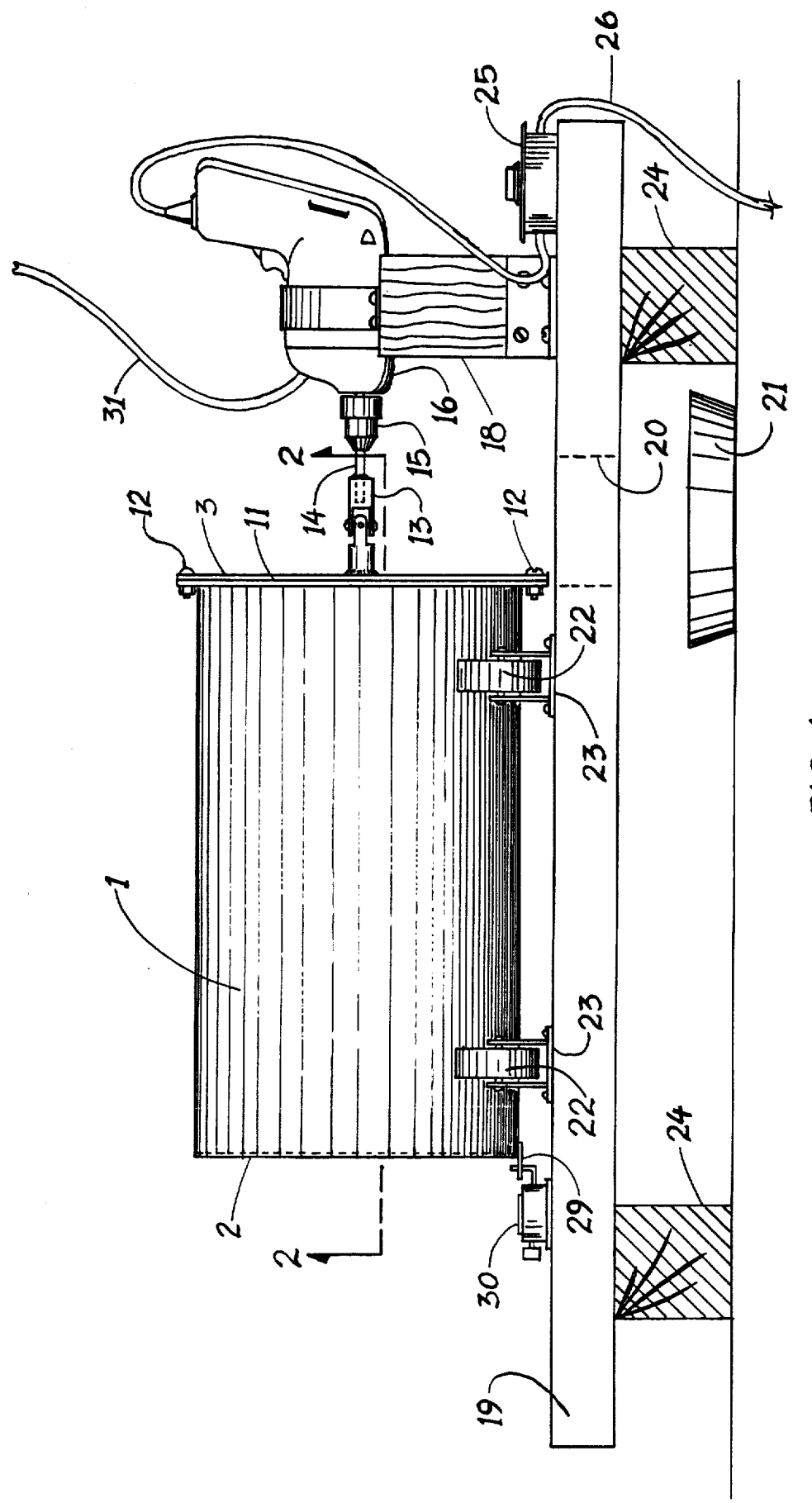
FIG. 1 is a plan view of the bench scale drum and power means.
Figure 3:
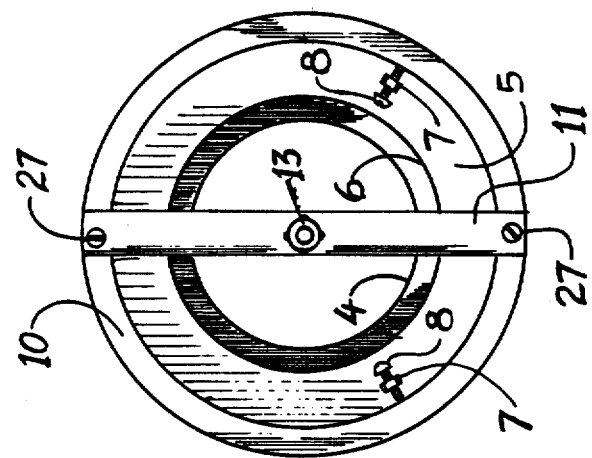
FIG. 3 is an end view of the drum of FIGS. 1 and 2.
Figure 2:
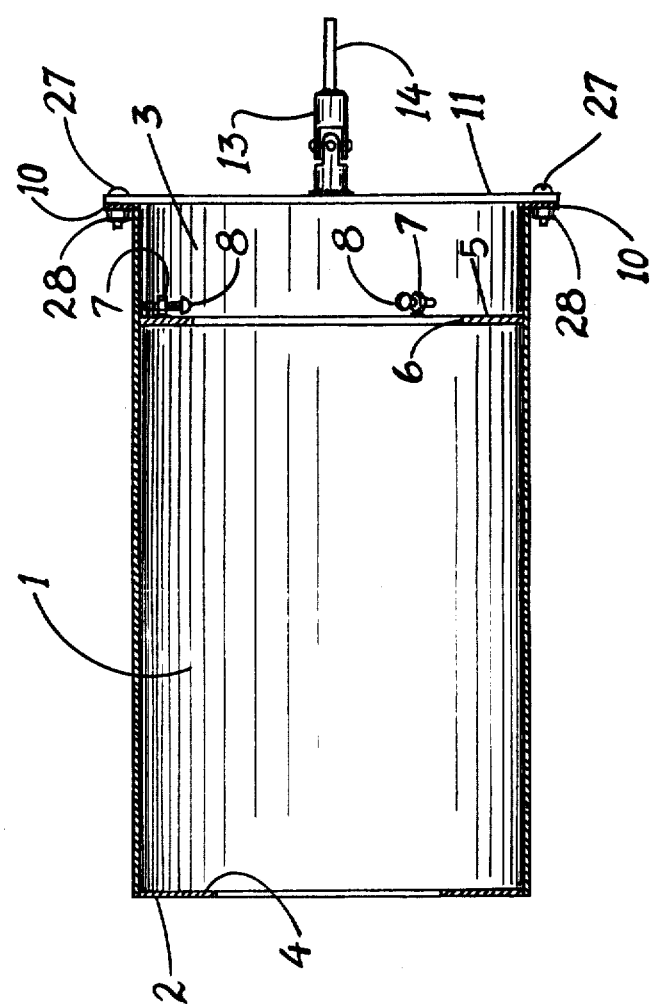
FIG. 2 is a section view taken along lines 2—2 of FIG. 1.

As shown in FIG. 1, I have provided a small scale (bench scale) apparatus suitable for experimental agglomerations which comprises an extended lengthwise cylinder or drum 1, provided with a feed end 2 and a discharge end 3. Referring to FIGS. 2 and 3, the end of the drum 2 is provided with a circular feed opening 4, while the discharge end 3 of the drum has located inwardly therefrom in spaced relation a movable retaining ring 5.

The retaining ring 5 is provided with a circular opening 6 and there are welded to the retaining ring three nuts 7 spaced at 120° intervals around the circumference of the ring. Each of the nuts 7 receive screws 8 which are adapted to be tightened against the surface of the inside of the cylinder.

To the discharge end of the drum there is welded a circular overlapping flange 10 to which is in turn secured a strap 11 by means of bolts 27 and nuts 28.

To the center of strap 11 there is welded a universal joint 13 whose outer end forms a drill shaft 14.

It can be seen that the shaft 14 is received by the chuck 15 of a mounted drill 16. The electric drill 16 is suitably fastened to a wooden block 18 which is in turn bolted fast to a table 19. The table 19 is provided with a suitable discharge opening 20 immediately below the drum and below which opening is placed a dish 21 to receive the discharged material.

The drum 1 is mounted to rest on four rollers or casters 22, which casters are suitably fastened to baseplate 23 attached to the table 19. The table 19 has suitable leg blocks 24 which support the table away from the main surface of the work area.

At the power end of the table there is mounted thereon a Variac type of solenoid control through which the power cord 26 for the drill 16 passes. In this manner it can be seen that the rotating speed of the drum or cylinder can be regulated from the discharge end.

The strap 11 can be removed for servicing or removal of the retaining ring 5.

At the feed end of the drum, there is welded an L-shaped flange 29 which strikes the arm of a counter 30 mounted on the table 19.

Due to the fact that the speed with which the drum or cylinder is rotated in its mounting may vary and may be extended for periods of time, it is necessary that a source of cooling air be supplied for the motor of the electric drill in the embodiment of the invention shown. Therefore, we have indicated that a hose 31 for cooling air should be mounted over the motor by suitable means in order to direct a blast of air on the motor for cooling.

An apparatus of the type illustrated in the embodiment shown in FIGS. 1, 2 and 3 has been used quite successfully for preparing small quantities of agglomerated materials. In an apparatus which I have constructed of this type, the drum is a cylinder ten inches in diameter by eighteen inches long. It is fabricated from 16-gauge A.I.S.I. type 304 stainless steel. The critical speed of the rotating cylinder is the speed above which solid material will be carried around on the inside surface of the drum by centrifugal force. This speed is determined by $R = 76.5/\sqrt{d}$, where d is the diameter of the cylinder in feet and R is the critical speed in revolutions per minute. The critical speed of the apparatus shown in FIG. 1 is 84 rpm. The variable speed drive is a $\frac{1}{4}$-inch industrial electric drill. Full speed is 1760 rpm, but the speed can be reduced by controls on the electric drill. Close speed control is achieved by inserting a variable speed reducer in the motor circuit, such as a Variac speed control commonly used with laboratory equipment. Operation for periods up to 30 minutes at speeds lower than 84 rpm will cause the motor to overheat and burn up unless supplemental cooling is applied. To provide the necessary cooling, part of the motor housing was removed and compressed air from the laboratory supply was applied on the motor winding at a rate of 18 liters per minute. The drum is turned by a $\frac{1}{4}$-inch shaft which fits in the chuck on the electric drill which also permits the drum to be readily and easily removed from the assembly. The entire assembly, as seen, is mounted on a wooden block, as shown, and the apparatus is light enough to permit it to be readily moved about the laboratory; and it is small enough to be placed under most laboratory hoods.

As will be obvious, the mixing in the laboratory experiments was done for the most part in a batch fashion, in a suitable tub, bowl or other container, as will be indicated by the examples which follow hereafter.

Figure 4:
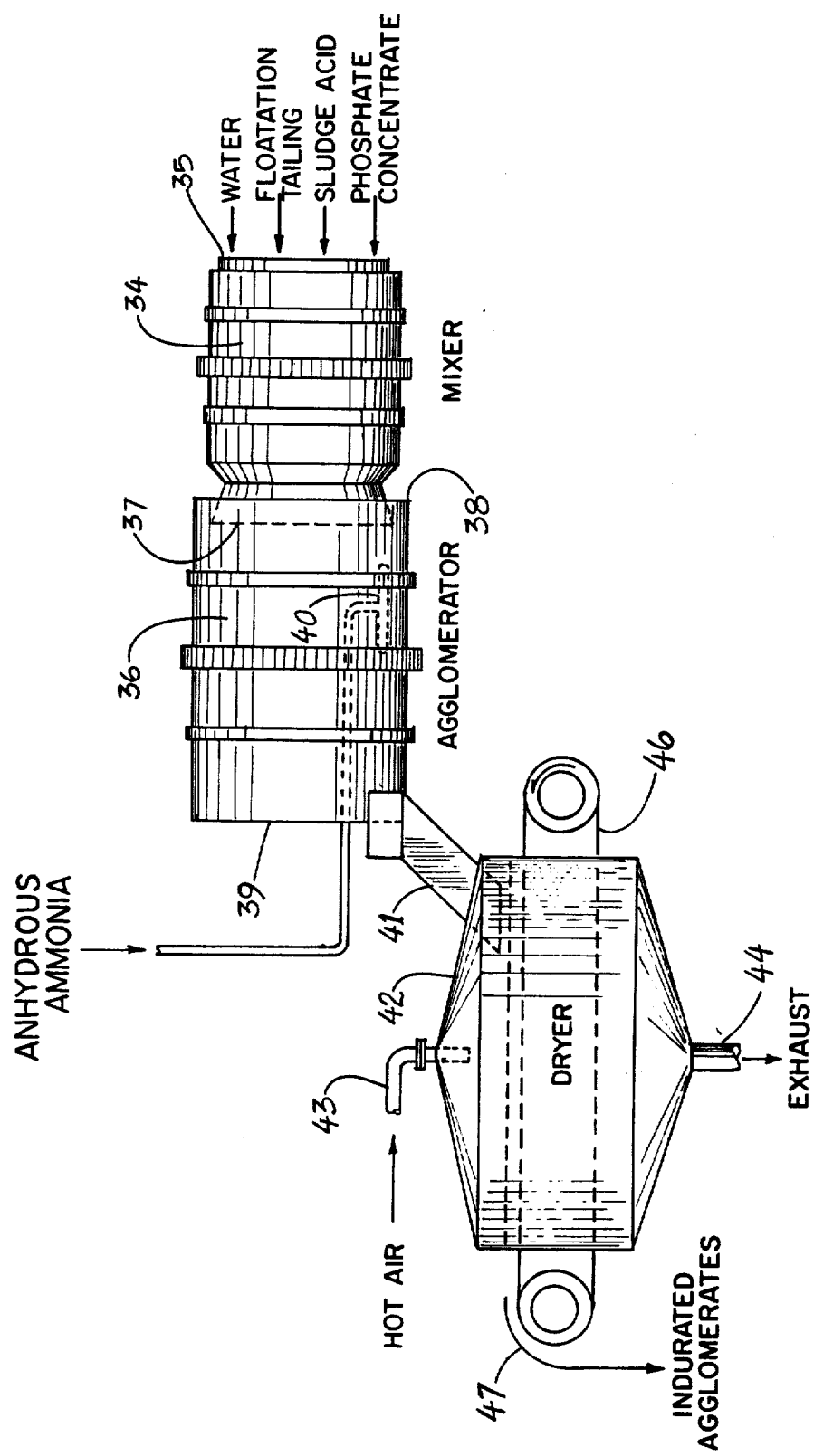
FIG. 4 is a diagrammatic illustration of a plant-scale agglomerator, mixer and dryer assembly.

Of course, referring more particularly to FIG. 4, it can readily be seen that any number of commercial type mixers, agglomerators and dryers for indurating the agglomerates can be employed. One is diagrammatically shown in FIG. 4, wherein a mixer of the cylindrical rotating type 34 is mounted in sequence with a cylindrical rotating agglomerator 36.

The mixture is fed into the feed end of the mixer 35 and discharged into the agglomerator from the discharge end 37, where it is received by the feed end 38 of the agglomerator and moved there through to the discharge end 39.

The agglomerator 36 would be provided with a sparger 40. The agglomerated material would be discharged into the chute 41 which enters the dryer 42, which is in turn fed by the hot air entering through the tube 43 and discharged through the tube 44. Within the dryer the agglomerated material is discharged on a moving belt 46 where it is indurated by the heat and discharged at point 47 in the process.

The following examples are offered to illustrate properly the use of the apparatus which is the subject of my invention and the process employed, as well as the composition of matter which is produced as a new composition.

EXAMPLE I

Metallurgical coke was purchased for use as a reducing carbon to make elemental phosphorus. The incoming coke was dried and screened on a 10-mesh screen to remove fines before the reducing carbon was blended with phosphate and silica. The minus 10-mesh coke fines were accumulated as a solid waste.

The pile of coke fines absorbed moisture from rainfall, and some extraneous material larger than 10-mesh in size accumulated in the pile. A sample from the fines pile was obtained; the moisture content was determined to be 8.2 percent. Part of the sample was screened on a 12-mesh U.S. Sieve (openings 1.68 mm) to obtain material for agglomeration experiments. The plus 12-mesh material was rejected.

A sample of merchant-grade wet-process phosphoric acid (52–54% $P_2O_5$) was obtained from a railroad car. Wet, screened coke and phosphoric acid were mixed by hand in a plastic container in proportions of 330 grams of coke (wet basis) and 64 grams of acid. Ninety grams of water were added. Thirty-six grams of reagent aqua ammonia (29% $NH_3$) were added. The quantity of ammonia added was inadequate for the complete neutralization of the phosphoric acid; the $N:P_2O_5$ weight ratio of the product was 0.26, assuming all the ammonia reacted. The temperature of the mixture increased to 70° C. when ammonia was added.

The mixture was fed to the agglomerator shown in FIG. 1 in six equal portions at a rate of about 74 grams per minute. The agglomerator drum rotated at a speed of 45 rpm, or approximately half its critical speed. The drum was horizontal during the experiment. The mixture discharged from the drum as rounded agglomerates after a retention time estimated to be 20 to 30 seconds. The freshly formed agglomerates were easily deformed. They fell about 1 inch onto an improvised ramp and rolled down the ramp into a container. A jet of compressed air was used to assist the agglomerates in rolling down the ramp. The agglomerates were dried 3 hours at 120° C. in a drying oven. The dried material contained 9.5 percent $P_2O_5$ and 1.9 percent N. Essentially all of the material was formed into agglomerates larger than the openings in a No. 6 U.S. Sieve (3.36-mm openings), and the average diameter of the agglomerates was estimated to be $\frac{3}{8}$-inch (9.5 mm). The average crushing strength of a $\frac{3}{8}$-inch diameter agglomerate was 11 pounds.

EXAMPLE II p An experiment similar to that described in Example I was carried out using sludge acid as the binder instead of merchant-grade wet-process phosphoric acid. A sample of sludge acid was obtained from material that had settled out in a railroad car used to transport the merchant-grade acid. The sludge was formed by post-precipitation of impurities in the acid during transit. The usual $P_2O_5$ content of the sludge acid is 38 percent. A mixture was prepared containing the following constituents.

440 grams of wet coke fines (405 grams on a dry basis)
120 grams of sludge acid
99 grams of aqua ammonia (29% $NH_3$)
100 grams of water The $P_2O_5$ content of the dried agglomerates was estimated to be 9.0 percent, and the nitrogen content was calculated to be 4.9 percent with a $N:P_2O_5$ weight ratio of 0.52. Although some ammonia volatilized without reacting, it is believed that the sludge acid was neutralized to diammonium phosphate. The crushing strength of $\frac{3}{8}$-inch agglomerates was 7 pounds.

EXAMPLE III

Florida pebble phosphate was crushed to provide some material smaller than 6 mesh in size. Fifty-nine percent was minus 6 mesh, plus 12 mesh and 42 percent minus 12 mesh. A 500-gram sample of the phosphate fines was mixed with 50 grams of water in a plastic container. The damp mixture was placed in the laboratory agglomerator shown in FIG. 1.

The agglomerator was operated batchwise during this experiment by installing a plate over the discharge end. The drum had a slope of 3°; the drum sloped toward the discharge end. The drum was rotated at a speed of 60 rpm.

Merchant-grade wet-process phosphoric acid was injected into the tumbling material through openings in a stainless steel sparger tube. The sparger was placed at the 5 o'clock position as viewed from the feed end; the drum rotated counter-clockwise. The sparger was about 1 inch from the wall of the drum. One hundred grams of the acid was sparged into the bed of material over a 9-minute period beginning at the start of rotation.

Fifty-five grams of anhydrous ammonia was sparged into the drum through openings in another stainless steel tube. The ammonia added was adequate to make diammonium phosphate, but no allowance was made for unreacted ammonia. The ammonia sparger was about 1 inch from the cylinder wall, and it was located at the 4 o'clock position as viewed from the feed end. The ammonia was added over a 15-minute period beginning at the start of rotation. Rotation of the drum was continued for 5 more minutes, making the total time of rotation 20 minutes. A metal spatula was used to divert material spilled from the sparger area toward the feed end of the drum.

The batch of agglomerates was removed from the drum and dried 4 hours in a laboratory oven at 120° C. The average size of the agglomerates was approximately $\frac{1}{4}$-inch. Eighty-nine percent was plus 6 mesh. The average crushing strength of $\frac{1}{4}$-inch agglomerates was 9 pounds.

EXAMPLE IV

An agglomerating experiment was carried out using the same equipment and procedure as that described in Example III. The formulation was as follows.

500 grams of phosphate fines (minus 6 mesh)
50 grams of water
142 grams of sludge acid
55 grams of anhydrous ammonia The screen analyses of the indurated agglomerates showed that 80 percent of the material was larger than 6 mesh and 20 percent was smaller than this mesh size. The average size of the agglomerates was about $\frac{1}{4}$-inch. The crushing strength of $\frac{1}{4}$-inch agglomerates was 8 pounds.

EXAMPLE V

This example illustrates the manner in which waste tailing from phosphate ore beneficiation would be agglomerated and used as phosphorus furnace charge. This example is based on background information on phosphate ore processing and beneficiation. The phosphate agglomeration processes given in Examples III and IV are applied in preparing an agglomerated self-fluxing phosphate mixture suitable for use in phosphorus furnaces.

Heretofore, clay present in phosphate ores has been utilized as a binder in preparing agglomerated phosphates for furnace feed. Clay is the binder in making green briquets and compacted flakes, and these agglomerates are more readily prepared when the phosphate contains a relatively large amount of clay. In nodulizing, clay in the phosphate reduces both the temperature of incipient fusion and the energy required for agglomeration. Nodulizing kiln linings are rapidly deteriorated when the phosphate contains no clay as an impurity.

Clay has an adverse effect on phosphorus furnace operations. Agglomerated phosphate containing clay must be calcined to indurate and stabilize the crystal structure of the material in order for the material to be used successfully for the production of phosphorus. With an agglomerated phosphate-clay mixture the material begins to fuse and consolidate above the zone of reduction, and this prevents gases generated by the reduction reactions from flowing uniformly through the furnace charge. However, lump phosphates which contain no clay can be used successfully in phosphorus furnaces without calcination. A publication entitled "Phosphorus Furnace Operations—How Are They Affected by Various Types of Phosphate Charges?" by J. C. Barber and E. C. Marks, Journal of Metals, December 1962, gives more detailed information on the effect of various types of phosphates on furnace operation.

In phosphate ore beneficiation, clay is separated from the ore in hydroseparators and cyclones. Clay is in the overflow and is discarded as waste slimes. In Florida the underflow generally undergoes flotation to separate the phosphate values from the quartz impurity. The quartz comes out as flotation tailing—another solid waste from one beneficiation. However, the tailing can be used in building roads and dikes, and in some cases the tailing has been used to dewater slimes. Phosphate concentrate is produced from beneficiation by the flotation process.

For the present example, phosphate concentrate is mixed with flotation tailing in porportions needed to provide a $SiO_2$:CaO weight ratio of 0.85. The mixture is self-fluxing; that is, the phosphate contains enough $SiO_2$ to combine with the CaO. Proportions are 73 percent phosphate concentrate and 27 percent flotation tailing. (The concentrate contained 30.5% $P_2O_5$.) About 4.6 percent of the $P_2O_5$ in the mixture comes from waste tailing. Composition of the mixture is as follows.

$P_2O_5$: 23.4 percent
CaO: 35.1 percent
$SiO_2$: 29.8 percent
$Fe_2O_3$: 1.0 percent
$Al_2O_3$: 1.2 percent The mixture of phosphate concentrate and flotation tailing normally consists of particles smaller than 16-mesh—a size that is readily agglomerated by the laboratory apparatus shown in FIG. 1. FIG. 4 illustrates the arrangement of plant equipment to be used in agglomerating and indurating the mixture of concentrate and tailing. The following proportions of materials are put in the rotary mixer.

0.733 ton phosphate concentrate
0.267 ton flotation tailing
0.100 ton water
0.160 ton of sludge acid containing about 38% $P_2O_5$ Water provides sufficient liquid phase for agglomeration and the sludge acid is the binder. Operation is continuous and the materials flow from the mixer into the agglomerator. Anhydrous ammonia is sparged into the agglomerator at a rate of 0.060 ton per ton of phosphate feed. The green agglomerates discharge onto a wire mesh belt which conveys the material under a drying hood. The agglomerates are heated to a temperature of about 250° F. by hot air. The indurated agglomerates are screened on a 6-mesh screen and the fines are recycled to the mixer. About 10 percent of the indurated agglomerates is fines. The plus 6-mesh agglomerates, containing 24.7 percent $P_2O_5$, are fed to the phosphorus furnace with sufficient coke needed for reduction. No silica rock is required.

EXAMPLE VI

A phosphorus plant produces elemental phosphorus at a rate of 109 tons per day. Furnace gases are treated in an electrostatic precipitator to remove particulate matter, and the gases are then contacted with water sprays in a spray condenser consisting of an open cylindrical chamber. The mixture of water and liquid phosphorus flows from the condenser to a sump; liquid phosphorus collects in the bottom of the sump and the water overflows into another sump. The water is recirculated to the spray condenser by pumping.

The gas mixture leaving the spray condenser consists of noncondensable gases (CO, $CO_2$, $CH_4$, and $N_2$) and uncondensed phosphorus vapor. The gases are exhausted by wet vacuum pumps (Nash Hytor pumps) using condenser water as the fluid in the pumps. The gases are pumped to a surface condenser (tubular) for further cooling and condensation of elemental phosphorus. The condenser tubes are irrigated by spraying condenser water inside the tubes. Liquid phosphorus recovered in the spray condenser and surface condenser is pumped to storage tanks where it is stored under water to keep it from burning.

Water contacts elemental phosphorus at the following places:
1. Spray condenser
2. Exhauster pumps
3. Surface condenser
4. Storage tanks The water is saturated with elemental phosphorus and phosphorus particles become suspended in the water. Water contaminated in this manner is commonly called "phossy" water.

In this example phossy water is generated at a rate of 1300 gallons per ton of phosphorus produced, and the water contains 1700 ppm of elemental phosphorus. The quantity of elemental phosphorus is 1.0 ton per day. Phossy water is treated in a clarifier at a rate of 99 gallons per minute. A commercial flocculating agent is added to aid in the clarification process. Overflow is the clarified water, and its rate is 97 gallons per minute. Underflow from the clarifier contains the settled solids which are treated to recover phosphorus values. Composition of the overflow is as follows:

|  | Grams per liter |
| --- | --- |
| Elemental phosphorus | 120 |
| Fluorine | 10 |
| $P_2O_5$ | 17 |
| $NH_3$ | 9 |

The overflow is returned to the phosphorus condensing system. However, accumulations of dissolved salts make it necessary to bleed off clarified water at a rate of 6 gallons per minute and replace this water with fresh water. The fluoride content of the water is not permitted to exceed 10 grams per liter to assure that fluosilicate concentrations do not reach saturation.

Clarified water bled from the system is mixed with plant cooling water to give a mixture containing about 23 ppm of elemental phosphorus. The mixture is further clarified by settling in a 14-acre pond. Pond overflow contains an average of 0.3 to 0.4 ppm of elemental phosphorus, but sometimes the phosphorus content at the pond outlet will go up to 1.0 to 2.0 ppm. The pond overflow discharges to a receiving stream.

Elemental phosphorus is very toxic to marine animals. Published information ["Toxicity of Yellow Phosphorus to Herring (*Clupea harengus*), Atlantic Salmon (*Salmo salar*), Lobster (*Homarus americanus*), and Beach Flea (*Gammarus oceanicus*)" V. Zitko, D. E. Aiken, S. N. Tibbo, K. W. T. Besch, and J. M. Anderson, Journal of Fisheries Research Board Canada, 27, No. 1, 21-29, 1970] has shown that elemental phosphorus contents of water as low as 40 parts per billion will kill some species of marine animals. Consequently, the phossy water treating method described in this example is not adequate for water pollution abatement, but heretofore no better abatement technology was known.

EXAMPLE VII

This example shows how wastewater from a phosphorus plant can be used as feedstock for making a suspension fertilizer and thereby avoid the discharge of any water waste contaminated with elemental phosphorus.

Phosphorus is produced at a rate of 109 tons per day and phossy water from the condensing system containing 1700 ppm of elemental phosphorus is treated in a clarifier at a rate of 99 gpm. Overflow from the clarifier contains 120 ppm of elemental phosphorus and the rate is 97 gallons per minute. A stream of clarified water is bled off to control the concentration of dissolved fluosilicates. The bleedoff rate is 6 gallons per minute. The bleedoff water is treated in a stacked disk centrifuge at a rate of 29 gallons per minute. (The centrifuge is operated about 20 percent of the time to treat bleedoff water.) The centrifuge overflow rate is 25 gallons per minute and the overflow contains 12 ppm of elemental phosphorus.

An ortho suspension fertilizer (13.5-38-0) is produced at the same site by three-step neutralization of merchant-grade wet-process phosphoric acid at a rate of 20 tons per hour. (The suspension fertilizer plant operates about 35 percent of the time.) The N:P$_2$O$_5$ weight ratio is 0.33. Attapulgite clay is added to keep the diammonium phosphate crystals in suspension. The quantity of materials needed to make one ton (2,000 pounds) of the suspension fertilizer is as follows:

Phosphoric acid: 1,407 pounds
Anhydrous ammonia: 328 pounds
Water: 350 pounds
Clay: 30 pounds Water is evaporated in the first stage of neutralization which occurs at the boiling point (230° F.). Also, water is evaporated in an evaporative cooler. Total loss of water by evaporation is 115 pounds per ton of 13.5-38-0 suspension fertilizer. The 350 pounds of water added per ton of suspension fertilizer is to replace water lost by evaporation and to provide dilution water for the process.

The centrifuge overflow is used as feedstock instead of water. The elemental phosphorus content of the suspension fertilizer is less than 1 ppm—a concentration that causes no phytotoxicity problem in fluid fertilizers. Furthermore, the elemental phosphorus is rapidly oxidized when applied to the soil ("Detoxification of White Phosphorus in Soil" by Hinrich L. Bohn, Journal of Agricultural and Food Chemistry, Vol. 18, No. 6, 1970.) The centrifuge overflow supplies 0.7 percent of the nutrients in 13.5-38-0 suspension fertilizer and reduces the nutrient cost $1.00 per ton of fertilizer produced.

EXAMPLE VIII

Phossy water generated in a 109 ton per day phosphorus plant is treated as described in Example VII. Centrifuge overflow water is obtained at a rate of 25 gpm and the water contains 12 ppm of elemental phosphorus.

Ortho suspension fertilizer (11-39-0) is produced by a two-step ammoniation process. The N:P$_2$O$_5$ weight ratio is in the range of 0.27 to 0.33—the weight ratio resulting in the highest solubility of nutrients. From 0.1 to 0.5 percent fluosilicic acid is added as a crystal modifier to form small needlelike monoammonium phosphate crystals as described in U.S. Defensive Publication T986,001, Sept. 4, 1979.

Centrifuge overflow water is used as feedstock in place of water normally used. The centrifuge overflow water supplies the fluosilicic acid needed to modify the size and shape of monoammonium phosphate crystals, and no fluosilicic acid is added. The fluosilicic acid content of the suspension fertilizer is 0.23 percent.

Thus it will be seen that I have provided an apparatus suitably adapted to meet the object and features hereinbefore set forth. It will further be seen that I have provided a method or process well adapted for a batch type laboratory embodiment but obviously applicable to continuous processes following the same steps to achieve the same ends.

From the foregoing it will be seen that the invention is well adapted to attain all of the ends and objects together with other advantages which are obvious and which are inherent to the apparatus, the method or process, and that a new composition of matter has been invented.

While I have shown and described particular embodiments of my invention, modifications and variations thereof will occur to those skilled in the art. I wish it to be understood, therefore, that the appended claims are intended to cover such modifications and variations which are within the true scope and spirit of my invention.

Having thus described the invention, what is claimed is:

1. Bench scale apparatus for agglomerating discrete solid particles by joining the same with a salt crystallized from a solution, comprising:
   a rotatably mounted horizontal cylinder with a ratio of diameter length of 0.3 to 0.8;
   variable drive means for said cylinder including a single phase electric motor;
   transfer means for said driving force including a sequentially connected universal joint;
   means for control of the speed of cylinder rotation including a variable electric resistance in the motor circuit;
   said control means varying the speed of rotation in the range of 25 to 75 percent of the critical speed, where such critical speed is determined by the formula $R = 76.5/\sqrt{d}$ where d is the diameter of the cylinder in feet and R is the critical speed in rpm to produce agglomerates by tumbling in said cylinder;

removable end plates in said cylinder having concentric openings 60 to 70 percent of the cylinder diameter;

air cooling means directed on said motor;

a mounting base plate for said assembly sized to fit into a laboratory hood.

2. A bench scale apparatus for agglomeration and a shatter resistance determination, all as described in claim 1, wherein:

said end plates are solid surface without openings;

ball bearings are loaded into said cylinder with agglomerated material;

such that a decrease in size of said agglomerates after tumbling is taken as a measure of abrasion and shatter resistance.

* * * * *